US010670747B2

(12) United States Patent
Tenghamn

(10) Patent No.: US 10,670,747 B2
(45) Date of Patent: Jun. 2, 2020

(54) PISTON INTEGRATED VARIABLE MASS LOAD

(71) Applicant: PGS Geophysical AS, Lilleaker, Oslo (NO)

(72) Inventor: Stig Rune Lennart Tenghamn, Katy, TX (US)

(73) Assignee: PGS Geophysical AS, Oslo (NO)

( * ) Notice: Subject to any disclaimer, the term of this patent is extended or adjusted under 35 U.S.C. 154(b) by 727 days.

(21) Appl. No.: 15/153,451

(22) Filed: May 12, 2016

(65) Prior Publication Data

US 2016/0259073 A1 Sep. 8, 2016

Related U.S. Application Data

(63) Continuation of application No. 14/462,098, filed on Aug. 18, 2014, now Pat. No. 9,341,725, which is a (Continued)

(51) Int. Cl.
*G01V 1/143* (2006.01)
*G01V 1/02* (2006.01)
(Continued)

(52) U.S. Cl.
CPC ............. *G01V 1/143* (2013.01); *G01V 1/02* (2013.01); *G01V 1/04* (2013.01); *G01V 1/159* (2013.01);
(Continued)

(58) Field of Classification Search
CPC combination set(s) only.
See application file for complete search history.

(56) References Cited

U.S. PATENT DOCUMENTS 2,978,669 A * 4/1961 Harris .................... G10K 13/00
367/175
3,241,099 A 3/1966 Elston et al.
(Continued)

FOREIGN PATENT DOCUMENTS

EP 0835462 1/2003
EP 2317341 A2 5/2011
(Continued)

OTHER PUBLICATIONS

Brigham, G., and B. Glass. "Present status in flextensional transducer technology." The Journal of the Acoustical Society of America 68.4 (1980): 1046-1052.
(Continued)

*Primary Examiner* — Hovhannes Baghdasaryan
*Assistant Examiner* — Amie M Ndure

(57) ABSTRACT

Embodiments relate to relate to marine vibrators that incorporate one or more piston plates that act on the surrounding water to produce acoustic energy. An example marine vibrator may comprise: a containment housing; a piston plate; a fixture coupled to the containment housing; a mechanical spring element coupled to the piston plate and the fixture; a driver disposed in the marine vibrator, wherein the driver is coupled to the piston plate and the fixture; and a container coupled to the piston plate, wherein the container is configured to hold a variable mass load; wherein the marine vibrator has a resonance frequency selectable based at least in part on the variable mass load.

20 Claims, 11 Drawing Sheets

Related U.S. Application Data continuation-in-part of application No. 14/284,847, filed on May 22, 2014, now Pat. No. 9,618,637.

(60) Provisional application No. 61/904,886, filed on Nov. 15, 2013, provisional application No. 61/880,561, filed on Sep. 20, 2013.

(51) Int. Cl.
*G01V 1/04* (2006.01)
*G01V 1/38* (2006.01)

(52) U.S. Cl.
CPC .............. *G01V 1/3843* (2013.01); *G01V 1/38* (2013.01); *G01V 2210/1293* (2013.01)

(56) References Cited

U.S. PATENT DOCUMENTS

| | | |
|---|---|---|
| 3,370,672 A | 2/1968 | Eberlan |
| 3,384,868 A | 5/1968 | Brown |
| 3,691,516 A | 9/1972 | Graham et al. |
| 3,978,940 A | 9/1976 | Bouyoucos |
| 3,993,973 A * | 11/1976 | Hutchins ............... G01S 1/72 367/172 |
| 4,175,311 A | 11/1979 | Bunyan |
| 4,184,714 A | 1/1980 | Pascouet et al. |
| 4,185,714 A | 1/1980 | Pascouet et al. |
| 4,211,301 A | 7/1980 | Milfsud |
| 4,231,112 A | 10/1980 | Massa |
| 4,466,083 A * | 8/1984 | Willard ............... G01S 1/72 367/175 |
| 4,483,411 A | 11/1984 | Mifsud |
| 4,556,963 A | 12/1985 | Hugus et al. |
| 4,557,348 A | 12/1985 | Milfsud |
| 4,584,438 A * | 4/1986 | Koenig ............... H04R 9/02 381/117 |
| 4,739,859 A | 4/1988 | Delano |
| 4,745,586 A * | 5/1988 | Massa ............... G01S 1/72 367/142 |
| 4,785,430 A | 11/1988 | Cole |
| 4,853,905 A | 8/1989 | Myers |
| 4,868,799 A * | 9/1989 | Massa ............... G01S 1/72 367/172 |
| 5,016,228 A | 5/1991 | Arnold et al. |
| 5,050,129 A | 9/1991 | Schultz |
| 5,062,089 A | 10/1991 | Willard et al. |
| 5,126,979 A | 6/1992 | Rowe, Jr. et al. |
| 5,199,005 A | 3/1993 | Forsberg |
| 5,206,839 A | 4/1993 | Murray |
| 5,225,731 A | 7/1993 | Owen |
| 5,233,570 A | 8/1993 | Donskoy |
| 5,646,380 A | 7/1997 | Vaage |
| 5,757,726 A | 5/1998 | Tenghamn et al. |
| 5,757,728 A | 5/1998 | Tenghamn et al. |
| 5,959,939 A | 9/1999 | Tenghamn et al. |
| 6,009,047 A | 12/1999 | Barger |
| 6,041,888 A | 3/2000 | Tenghamn |
| 6,076,629 A | 6/2000 | Tenghamn |
| 6,076,630 A | 6/2000 | Ambs |
| 6,085,862 A | 7/2000 | Tenghamn |
| 6,230,840 B1 | 5/2001 | Ambs |
| 6,173,803 B1 | 11/2001 | Barger |
| 6,556,510 B2 | 4/2003 | Ambs |
| 6,606,958 B1 | 8/2003 | Buyoucos |
| 6,624,539 B1 | 9/2003 | Hansen et al. |
| 6,711,097 B1 | 3/2004 | Engdahl |
| 6,851,511 B2 | 2/2005 | Tenghamn |
| 6,901,028 B2 | 5/2005 | Clayton et al. |
| 7,142,481 B1 | 11/2006 | Metzbower et al. |
| 7,377,357 B2 | 5/2008 | Duren et al. |
| 7,468,932 B2 | 12/2008 | Tenghamn |
| 7,539,079 B2 | 5/2009 | Hoogeveen et al. |
| 7,551,518 B1 | 6/2009 | Tenghamn |
| 7,562,740 B2 | 7/2009 | Ounadjela |
| 7,881,158 B2 | 2/2011 | Tenghamn |
| 7,926,614 B2 | 4/2011 | Tenghamn et al. |
| 7,929,380 B2 | 4/2011 | Wei et al. |
| 7,957,220 B2 | 6/2011 | Howlid et al. |
| 7,974,152 B2 | 7/2011 | Tenghamn |
| 8,050,139 B2 | 11/2011 | Berstad |
| 8,050,867 B2 | 11/2011 | Johnson et al. |
| 8,061,471 B2 | 11/2011 | Wei |
| 8,079,440 B2 | 12/2011 | Laycock |
| 8,081,540 B2 | 12/2011 | Ross |
| 8,094,514 B2 | 1/2012 | Tenghamn |
| 8,098,542 B2 | 1/2012 | Hillesund et al. |
| 8,102,731 B2 | 1/2012 | Cambois |
| 8,154,176 B2 | 4/2012 | Karakaya et al. |
| 8,167,082 B2 | 5/2012 | Eick et al. |
| 8,174,927 B2 | 5/2012 | Hopperstad et al. |
| 8,189,426 B2 | 5/2012 | West et al. |
| 8,205,711 B2 | 6/2012 | Hopperstad et al. |
| 8,261,875 B2 | 9/2012 | Eick et al. |
| 8,331,198 B2 | 12/2012 | Morozov et al. |
| 8,335,127 B2 | 12/2012 | Tenghamn |
| 8,342,288 B2 | 1/2013 | Eick et al. |
| 8,400,872 B2 | 3/2013 | Gulgne et al. |
| 8,427,901 B2 | 4/2013 | Lunde et al. |
| 8,441,892 B2 | 5/2013 | Morozov et al. |
| 8,446,798 B2 | 5/2013 | Tenghamn |
| 8,582,395 B2 | 11/2013 | Ferber |
| 8,630,149 B2 | 1/2014 | Thompson et al. |
| 8,634,276 B2 | 1/2014 | Morozov et al. |
| 8,662,243 B2 | 3/2014 | Eick et al. |
| 8,670,292 B2 | 3/2014 | Engdahl |
| 8,804,462 B2 | 8/2014 | Babour et al. |
| 8,971,152 B2 | 3/2015 | Chelminski |
| 9,341,725 B2 | 5/2016 | Tenghamn |
| 10,036,825 B2 * | 7/2018 | Hibbs ............... E21B 47/102 |
| 2006/0193203 A1 | 8/2006 | Tenghamn et al. |
| 2008/0253226 A1 | 10/2008 | Tenghamn et al. |
| 2009/0147626 A1 | 6/2009 | Vahida et al. |
| 2009/0279387 A1 | 11/2009 | Tenghamn et al. |
| 2010/0118647 A1 | 5/2010 | Tenghamn |
| 2010/0322028 A1 | 12/2010 | Tenghamn |
| 2011/0038225 A1 | 2/2011 | Tenghamn |
| 2011/0069741 A1 | 3/2011 | Erickson |
| 2011/0075520 A1 | 3/2011 | Gulgne et al. |
| 2011/0085422 A1 | 4/2011 | Thompson et al. |
| 2011/0090759 A1 | 4/2011 | Laycock |
| 2011/0162906 A1 | 7/2011 | Harper et al. |
| 2011/0297476 A1 | 12/2011 | Harper et al. |
| 2011/0317515 A1 * | 12/2011 | Tenghamn ............ G01V 1/145 367/20 |
| 2012/0075955 A1 | 3/2012 | Dean |
| 2012/0081997 A1 | 4/2012 | Babour et al. |
| 2012/0113747 A1 | 5/2012 | Ferber |
| 2012/0147699 A1 | 6/2012 | Dellinger et al. |
| 2012/0147709 A1 | 6/2012 | Zowarka, Jr. et al. |
| 2012/0155217 A1 | 6/2012 | Dellinger et al. |
| 2012/0188845 A1 | 7/2012 | Jeffryes |
| 2012/0232780 A1 | 9/2012 | Delson et al. |
| 2012/0314536 A1 | 12/2012 | Bagaini |
| 2013/0037342 A1 | 2/2013 | Engdahl |
| 2013/0100777 A1 | 4/2013 | Ruet |
| 2013/0201792 A1 | 8/2013 | Douma |
| 2013/0238249 A1 | 9/2013 | Xu |
| 2014/0238773 A1 * | 8/2014 | Sallas ............... G01V 1/188 181/121 |
| 2014/0254313 A1 | 9/2014 | Dowle |
| 2014/0334254 A1 | 11/2014 | Zrostlik et al. |
| 2014/0334259 A1 | 11/2014 | Tenghamn |
| 2014/0340985 A1 | 11/2014 | Tenghamn et al. |
| 2015/0085605 A1 | 3/2015 | Tenghamn |
| 2015/0085606 A1 * | 3/2015 | Tenghamn ............ G01V 1/143 367/15 |
| 2015/0085607 A1 * | 3/2015 | Tenghamn ............ G01V 1/145 367/15 |
| 2015/0085608 A1 | 3/2015 | Tenghamn et al. |
| 2015/0185341 A1 * | 7/2015 | Ryttersson ............ G01V 1/04 367/15 |

(56) References Cited

U.S. PATENT DOCUMENTS

2015/0234072 A1* 8/2015 McConnell .......... G01V 1/3861
367/156

FOREIGN PATENT DOCUMENTS

| RU | 2159945 | 11/1999 |
|---|---|---|
| WO | 1995030912 | 11/1995 |
| WO | 1997001770 | 1/1997 |
| WO | 9917473 | 4/1999 |
| WO | 2000071266 | 11/2000 |

OTHER PUBLICATIONS

Tressler, James F., et al. "Finite element analysis of the cymbal-type flextensional transducer." IEEE transactions on ultrasonics, ferroelectrics, and frequency control 45.5 (1998): 1362-1369.
Ochoa, Pilar, et al. "Tunability of cymbals as piezocomposite transducers." Journal of electroceramics 14.3 (2005): 221-229.
Ochoa, P., et al. "Advantages and limitations of cymbals for sensor and actuator applications." Sensors and Actuators A: Physical 132.1 (2006): 63-69.
USPTO Office Action for U.S. Appl. No. 14/062,182 dated Jul. 13, 2016.
USPTO Office Action for U.S. Appl. No. 14/284,847 dated Apr. 14, 2014.
European Search Report for European Application No. EP 14 18 5770 dated Sep. 19, 2016.
Communication for European Patent Office for Application No. 14185772.2 dated May 7, 2016.
Communication for European Patent Office for Application No. 14185771.4 dated May 7, 2016.
European Search Report for Application No. 14185770.6 dated Jun. 8, 2016.
USPTO Office Action for U.S. Appl. No. 14/284,847 dated Sep. 8, 2015.
USPTO Office Action for U.S. Appl. No. 14/462,052 dated Oct. 16, 2015.
USPTO Final Office Action for U.S. Appl. No. 14/284,847 dated Dec. 31, 2015.
European Search report for European Application No. 14183242.8 dated Sep. 14, 2015.
Rune Tenghamn, "PGS Electrical Marine Vibrator." Tech Link, Nov. 2005, pp. 1-3, vol. 5, No. 11, Publication of PGS Geophysical.
Rune Tenghamn and Andrew Long, "PGS shows off electrical marine vibrator to capture alternative seismic source market", First Break, Jan. 2006, pp. 11-14, vol. 24.
Rune Tenghamn "Complementing Seismic Source Technology with Marine Vibrators," Presented at PGS Technology day in Oslo, Norway, Oct. 16, 2012.
Feng et al., "A class IV Fextensional Device Based on Electrostrictive Poly(vinylidene flouride-trifluoroethylene copolymer," Jun. 2003, pp. 1-6.
Ralph S. Woollett, "Underwater Hemholtz-Resonator Transducers: General Design Principles," NUSC Technical Report 5633, Jul. 5, 1977, pp. 1-48.
Rolex Spring Catalog, MW Industries, Inc., 2009.
Fons Ten Kroode et al., "Broadband seismic data—The importance of low frequencies," Geophysics, Mar.-Apr. 2013, pp. WA3-WA14, vol. 78, No. 2.
Ralph S. Woollett, "Current Approaches to the Miniaturization and Pressure Release Problems of VLF Transducers," Naval Underwater Systems Center, Nov. 5, 1973.
USPTO Office Action for U.S. Appl. No. 14/462,098 dated Oct. 9, 2015.
Examination report for Australia Application No. 2014227547 dated Jun. 4, 2019.
Examination report for Australia Application No. 2014227546 dated Jan. 11, 2019.
USPTO Office Action for U.S. Appl. No. 15/443,757 dated Oct. 2, 2019.
European Search Report for Application No. 14185771.4 dated Mar. 28, 2019.
Australian Examination Report for Application No. 2014227546 dated Jan. 11, 2019.
European Search Report for Application No. 14185770.6 dated Apr. 1, 2019.

* cited by examiner

PISTON INTEGRATED VARIABLE MASS LOAD

CROSS-REFERENCE TO RELATED APPLICATIONS

The present application is a continuation of U.S. patent application Ser. No. 14/462,098, filed on May 22, 2014, which claims priority to U.S. Provisional Application No. 61/904,886, filed on Nov. 15, 2013, and is a continuation-in-part of U.S. Nonprovisional application Ser. No. 14/284,847, filed on May 22, 2014, which claims priority to U.S. Provisional Application No. 61/880,561, filed on Sep. 20, 2013, the entire disclosures of which are incorporated herein by reference.

BACKGROUND

Embodiments relate generally to piston-type marine vibrators for marine geophysical surveys. More particularly, embodiments relate to the addition of a variable mass load to the outer piston plate of a piston-type marine vibrator to compensate for air-spring effects.

Sound sources are generally devices that generate acoustic energy. One use of sound sources is in marine seismic surveying in which the sound sources may be employed to generate acoustic energy that travels downwardly through water and into subsurface rock. After interacting with the subsurface rock, for example, at boundaries between different subsurface layers, some of the acoustic energy may be reflected back toward the water surface and detected by specialized sensors, in the water, typically either on the water bottom or towed on one or more streamers. The detected energy may be used to infer certain properties of the subsurface rock, such as structure, mineral composition and fluid content, thereby providing information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize compressed air to generate a sound wave. Other examples of impulsive-type sources include explosives and weight-drop impulse sources. Another type of sound source that can be used in marine seismic surveying includes marine vibrators, such as hydraulically powered sources, electro-mechanical vibrators, electrical marine seismic vibrators, and sources employing piezoelectric or magnetostrictive material. Marine vibrators typically generate vibrations through a range of frequencies in a pattern known as a "sweep" or "chirp."

Prior sound sources for use in marine seismic surveying have typically been designed for relatively high-frequency operation (e.g., above 10 Hz). However, it is well known that as sound waves travel through water and through subsurface geological structures, higher frequency sound waves may be attenuated more rapidly than lower frequency sound waves, and consequently, lower frequency sound waves can be transmitted over longer distances through water and geological structures than can higher frequency sound waves. Thus, efforts have been undertaken to develop sound sources that can operate at lower frequencies. Very low frequency sources ("VLFS") have been developed that typically have at least one resonance frequency of about 10 Hz or lower. VLFS's are typically characterized by having a source size that is very small as compared to a wavelength of sound for the VLFS. The source size for a VLFS is typically much less than $1/10^{th}$ of a wavelength and more typically on the order of $1/100^{th}$ of a wavelength. For example, a source with a maximum dimension of 3 meters operating at 5 Hz is $1/100^{th}$ of a wavelength in size.

In order to achieve a given level of output in the water, a marine vibrator typically needs to undergo a change in volume. In order to work at depth while minimizing structural weight, the marine vibrator may be pressure balanced with external hydrostatic pressure. As the internal gas (e.g., air) in the marine vibrator increases in pressure, the bulk modulus (or "stiffness") of the internal gas also rises. Increasing the bulk modulus of the internal gas also increases the air-spring effect within the marine vibrator. As used herein, the term "air spring" is defined as an enclosed volume of air that may absorb shock or fluctuations of load due to the ability of the enclosed volume of air to resist compression and decompression. Increasing the stiffness of the air in the enclosed volume increases the air-spring effect and thus the ability of the enclosed volume of air to resist compression and decompression. This increase in the air-spring effect of the internal gas tends to be a function of the operating depth of the source. Further, the stiffness of the acoustic components of the marine vibrator and the internal gas are the primary determining factors in the marine vibrator's resonance frequency. Accordingly, the resonance frequency generated by the marine vibrator may undesirably increase when the marine vibrator is towed at depth, especially in marine vibrators where the interior volume of the marine vibrator may be pressure balanced with the external hydrostatic pressure.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to marine vibrators for marine geophysical surveys that incorporate one or more piston plates that may act on the surrounding water to produce acoustic energy. In some embodiments, the marine vibrators may further comprise one or more drivers coupled to the piston plates to cause the piston plates to move back and forth. The marine vibrators may also include one or more springs coupled to the piston plates and a fixture. In one or more embodiments, a variable mass load may be added to a container attached to a piston plate of a marine vibrator. The variable mass load may be added to compensate for air spring effects. As discussed in more detail below, the variable mass load may shift the resonance frequency of the marine vibrator lower to alleviate problems due to pressure increases in the marine vibrator. Advantageously, the marine vibrators may display a low resonance frequency in the seismic frequency range of interest. In particular embodiments, the marine vibrators may display a first resonance frequency (when submerged in water at a depth of from about 0 meters to about 300 meters) within the seismic frequency range of about 1 Hz to about 10 Hz.

Piston-type marine vibrators, which may include an actuator and a spring, act as mechanical transformers, which transform the displacement and force generated in the active element to meet the demands of different applications. Piston-type marine vibrators are generally marine vibrators having a piston plate that vibrates to generate acoustic energy.

Figure 1:
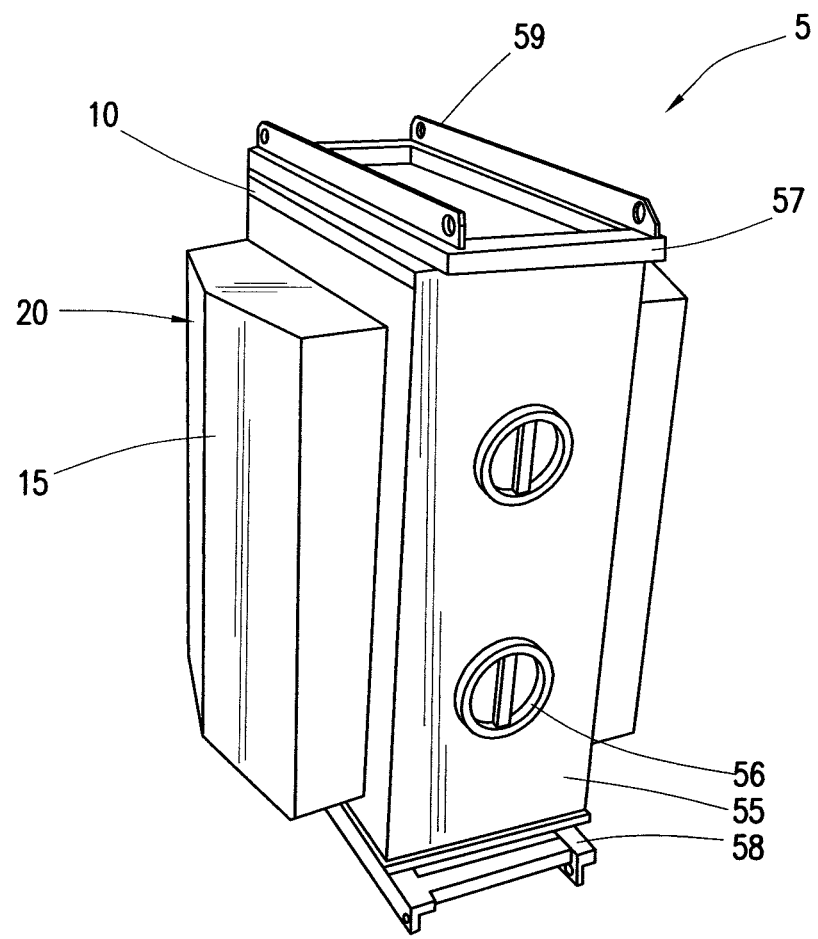
FIG. 1 illustrates an example embodiment of a marine vibrator with a container and variable mass load.

FIG. 1 is an example embodiment of a piston-type marine vibrator, illustrated as marine vibrator 5. As illustrated, marine vibrator 5 may comprise piston plate 10 and container 15. In the illustrated embodiment, the container 15 may be configured to contain a variable mass load 20. In embodiments, marine vibrator 5 comprises an internal gas pressure. By way of example, marine vibrator 5 may define an internal volume in which a gas may be disposed, this internal volume of gas providing the internal gas pressure of marine vibrator 5. In some embodiments, marine vibrator 5 may have a pressure compensation system. The pressure compensation system may be used, for example, to equalize the internal gas pressure of marine vibrator 5 with the external pressure. The internal gas pressure of marine vibrator 5 will be referred to herein as the "marine vibrator internal gas pressure." Pressure compensation may be used, for example, where marine vibrator 5 needs to be towed at depth to achieve a given level of output. As the depth of marine vibrator 5 increases, the internal gas pressure may be increased to equalize pressure with the increasing external pressure. A gas (e.g., air) may be introduced into marine vibrator 5, for example, to increase the internal gas pressure.

Without being limited by theory, increasing the marine vibrator internal gas pressure may create an air-spring effect that undesirably impacts the resonance frequency of marine vibrator 5. In particular, the resonance frequency may increase as the marine vibrator internal gas pressure increases. Those of ordinary skill in the art, with the benefit of this disclosure, should appreciate that an increase in the marine vibrator internal gas pressure may also result in an increase of the bulk modulus or air-spring effect of the gas (e.g., air) in the marine vibrator 5. Among other things, the resonance frequency of marine vibrator 5 is based on the combination of the air spring of the gas in marine vibrator 5 and the mechanical spring element (e.g., mechanical spring elements 65 on FIG. 4) in the marine vibrator 5. Thus, increasing the bulk modulus or air-spring effect of the internal gas of marine vibrator 5 may also result in an increase in the resonance frequency. As such, the resonance frequency of a marine vibrator 5 towed at depth may undesirably increase when the marine vibrator internal gas pressure is compensated by equalization with the external pressure (e.g., by using a pressure compensation system).

Figure 3:
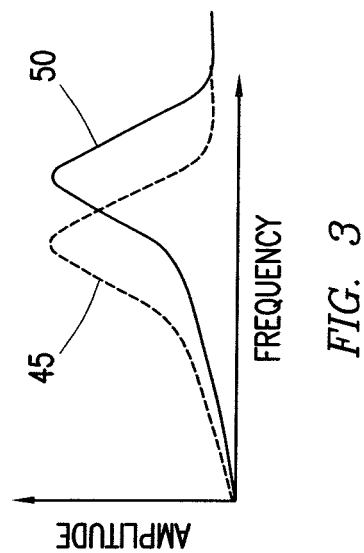
FIG. 3 illustrates the shift in resonance frequency due to the air spring effect as the marine vibrator is being towed deeper in accordance with example embodiments.
Figure 2:
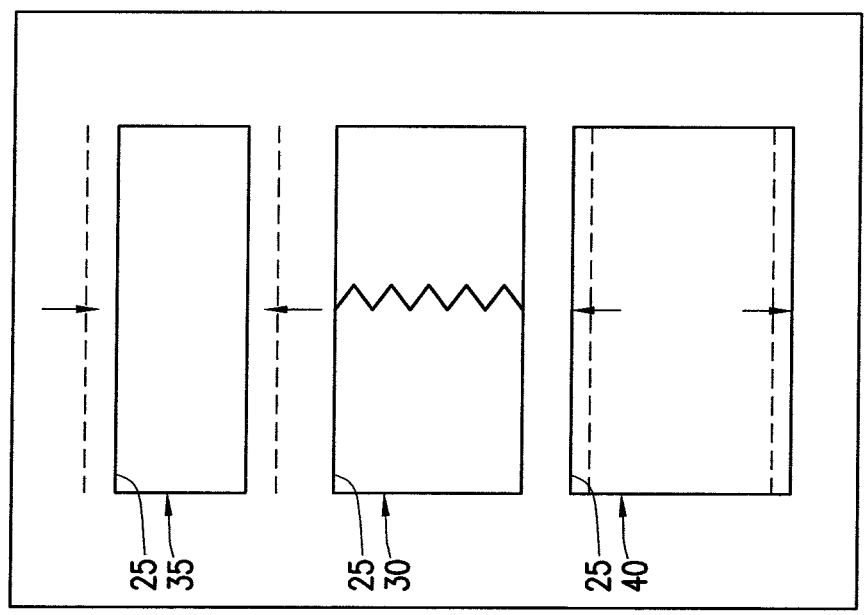
FIG. 2 illustrates the change in the air spring effect as the pressure and volume of the internal gas is altered in accordance with example embodiments

FIGS. 2 and 3 illustrate the effect of an air spring on marine vibrator 5 at various depths in accordance with example embodiments. In FIG. 2, the volume of the internal gas of marine vibrator 5 is represented by reference number 25. To illustrate the air spring effect, volume 25 of the internal gas is shown at ambient pressure at 30, under compression at 35, and under expansion at 40. FIG. 2 therefore illustrates the relationship between pressure and volume in relation to the air spring effect. Thus, and assuming a constant temperature, as volume 25 of increases, the pressure of the internal gas will decrease as will the air spring effect. Conversely, as volume 25 decreases, the pressure of the internal gas will increase and so too will the air spring effect. With respect to FIG. 3, the curve shown at 45 is a hypothetical representation of the acoustic energy output of marine vibrator 5 at D meters depth without pressure compensation. The curve shown at 50 represents the output of marine vibrator 5 at D+x meters depth with pressure compensation. Pressure compensation may cause an increase in the internal gas pressure, and thus a resulting increase in the air spring effect. As illustrated by FIG. 3, the resonance frequency of marine vibrator 5 may shift higher with pressure compensation, thus demonstrating how an increase in the air spring effect may result in a higher resonance frequency. As illustrated, the increase in resonance frequency becomes more pronounced at greater depths.

To compensate for these changes in the internal gas pressure, variable mass load 20 may be a component of marine vibrator 5. By way of example, variable mass load 20 may be added to piston plate 10 of marine vibrator 5 to shift the resonance frequency lower. In some embodiments, variable mass load 20 may increase in mass with increasing depth of marine vibrator 5 in water. In particular embodiments, variable mass load 20 may be implemented into marine vibrator 5 via container 15 attached to piston plate 10 of marine vibrator 5. Container 15 may be configured to fill with water as marine vibrator 5 is lowered into the water. In embodiments, variable mass load 20 may be added outside of piston plate 10. Variable mass load 20 may be appropriately sized to compensate for the entire frequency change due to increasing depth, resulting in the same resonance frequency independent of water depth.

Figure 4:
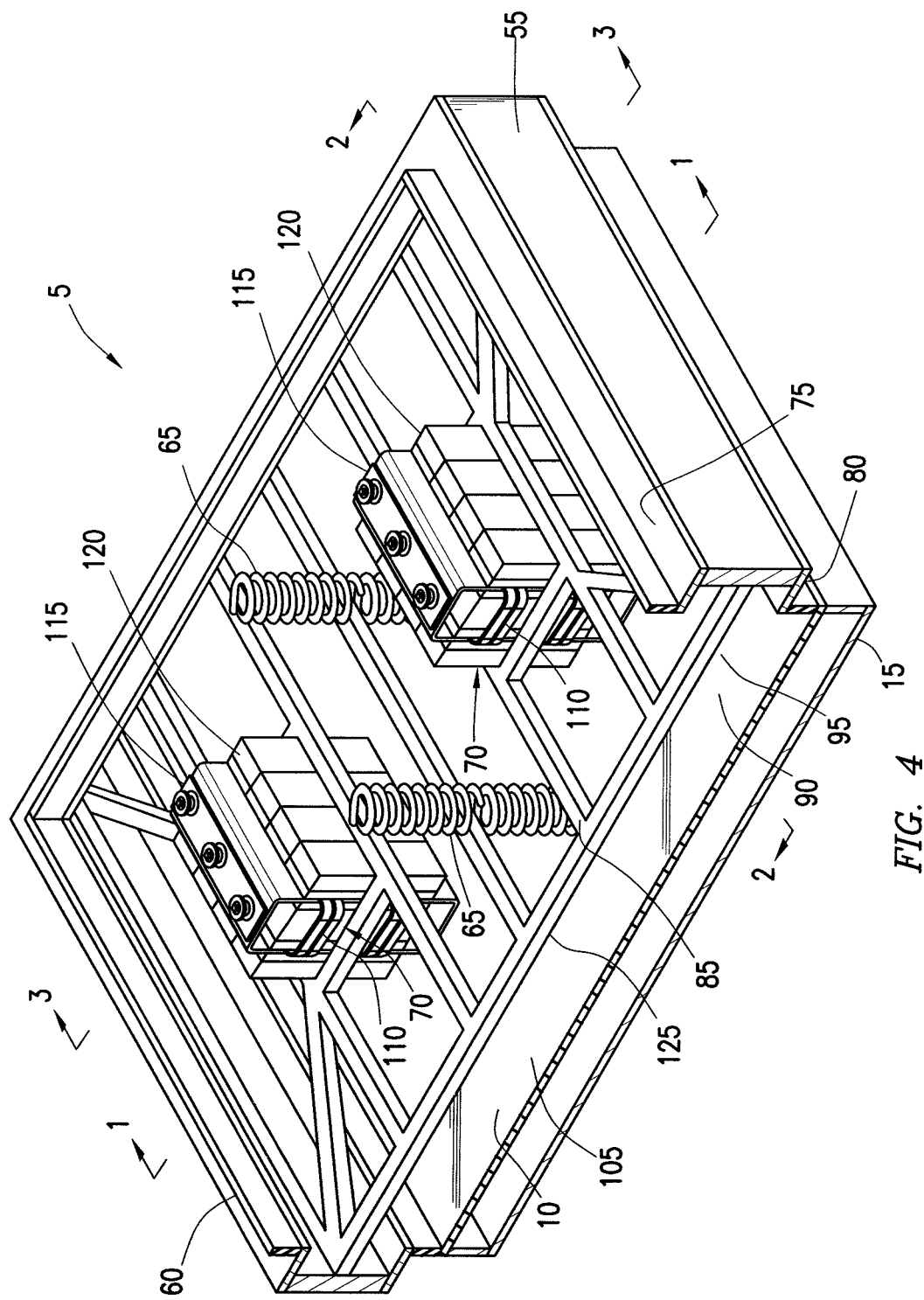
FIG. 4 illustrates a partial cross-sectional view of the marine vibrator of FIG. 1.
Figure 5:
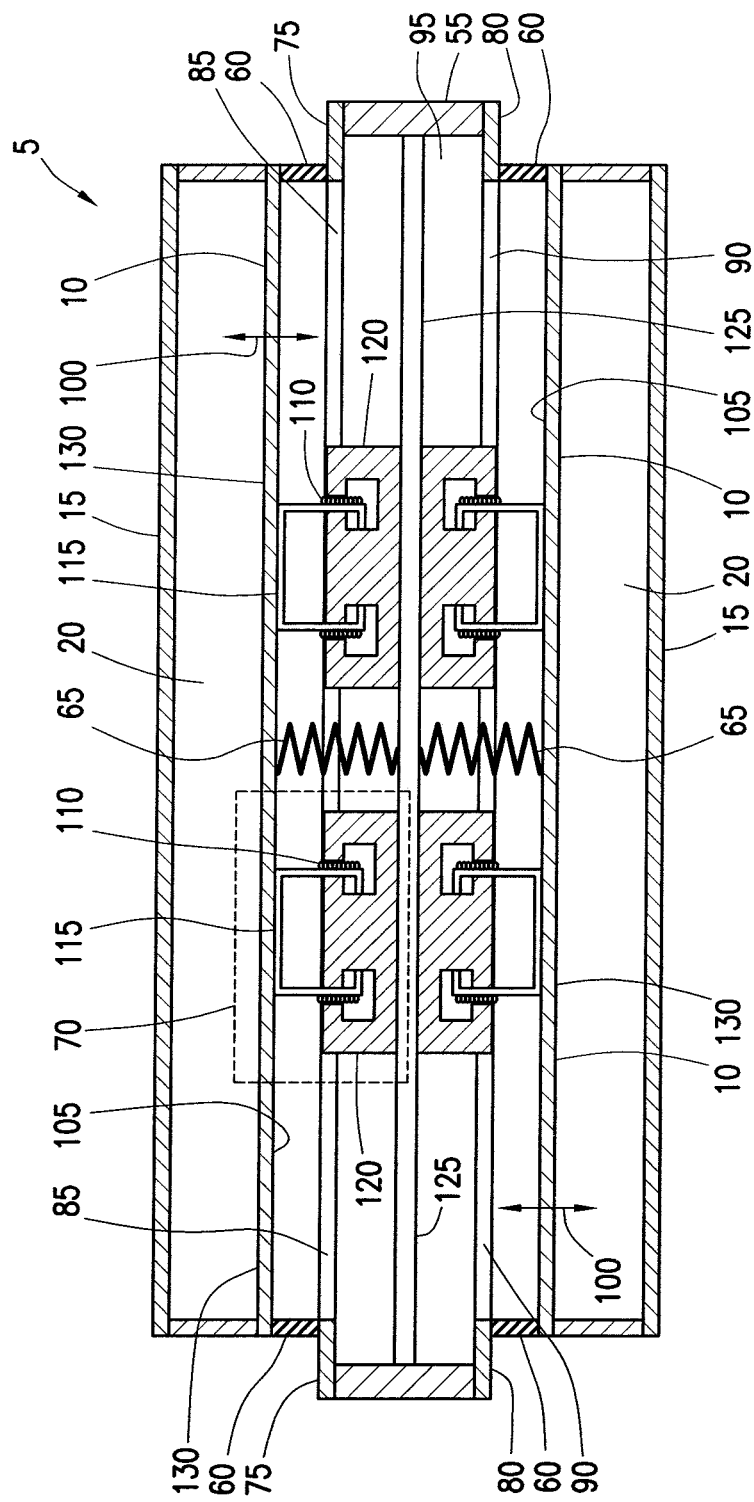
FIG. 5 illustrates a cross-sectional view of the marine vibrator of FIGS. 1 and 4 taken along line 1-1 of FIG. 4.
Figure 6:
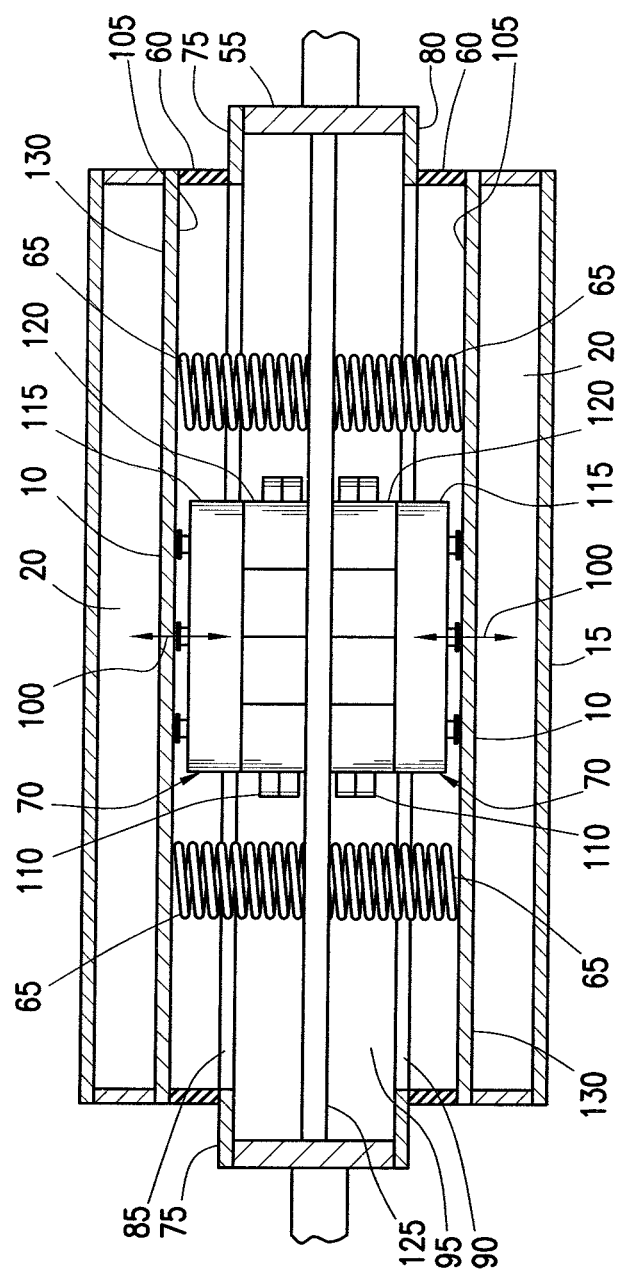
FIG. 6 illustrates a cross-sectional view of the marine vibrator of FIGS. 1 and 4 taken along line 2-2 of FIG. 4.

Turning now to FIGS. 4-6, and with additional reference to FIG. 1, an embodiment of marine vibrator 5 is described. FIG. 4 is a partial cross-sectional view of the embodiment of marine vibrator 5 of FIG. 1 with container 15, variable mass load 20, and one of the piston plates 10 on one side of the marine vibrator 5 removed for the ease of description. FIG. 5 is a cross-sectional view of the embodiment of marine vibrator 5 of FIGS. 1 and 4 taken along line 1-1 of FIG. 4. FIG. 6 is a cross-sectional view of the embodiment of marine vibrator 5 of FIGS. 1, 4, and 5 taken along line 2-2 of FIG. 4.

In the illustrated embodiment, marine vibrator 5 includes a containment housing 55. Piston plates 10 may be flexibly coupled to containment housing 55, for example, by way of rubber seals 60. As best seen in FIGS. 4-6, piston plates 10 may each have mechanical spring elements 65 attached to them. One or more drivers 70 may be disposed in containment housing 55 to cause the piston plates 10 to move back and forth. This motion of piston plates 10 may take advantage of the flexibility of rubber seals 60. As would be understood by one of ordinary skill in the art with the benefit of this disclosure, rubber seals 60 do not need to be made of rubber, but rather may be made from any material that allows a flexible coupling of piston plates 10 to containment housing 55 as further discussed below.

Containment housing 55 may have first surface 75 and second surface 80, which may be opposing one another. As best seen on FIGS. 4-6, first opening 85 and second opening 90 may be formed respectively in the first surface 75 and the second surface 80. While not illustrated, embodiments may include windows or openings 85, 90 that may be larger or smaller than piston plates 10. Marine vibrator 5 further comprises an interior volume 95 which may be at least partially defined by containment housing 55 and piston plates 10. In some embodiments, mechanical spring elements 65 and drivers 70 may be at least partially disposed within interior volume 95. In alternative embodiments, mechanical spring elements 65 and drivers 70 may be entirely disposed within interior volume 95. While not illustrated, in further alternative embodiments, mechanical spring elements 65 may be disposed outside containment housing 55 so long as mechanical spring elements 65 are coupled to fixture 125. In some embodiments, marine vibrator 5 may be pressure compensated such that the pressure within interior volume 95 may be kept the same as the external pressure (i.e. the pressure on the side of piston plate 10 opposite that of interior volume 95), thus enabling operation at greater depth, for example, up to about 300 meters or more. Containment housing 55 together with piston plates 10 and rubber seals 60 may form a waterproof housing for the other components of marine vibrator 5, such as mechanical spring elements 65 and drivers 70. Containment housing 55 may be constructed from any suitable material, including, without limitation, steel (e.g., stainless steel), aluminum, a copper alloy, glass-fiber reinforced plastic (e.g., glass-fiber reinforced epoxy), carbon fiber reinforced plastic, and combinations thereof. Similarly, containment housing 55 as best seen in FIGS. 1 and 4-6, may have the general shape of a rectangular box. It should be understood that other configurations of containment housing 55 may be suitable, including those having the general shape of a square box or other suitable shapes.

As best seen in FIG. 1, in some embodiments, containment housing 55 may further include optional caps 56, which may be disposed in a lateral side of containment housing 55. In particular embodiments, one or more of caps 56 may be removable. By way of example, caps 56 may facilitate attachment of a device, such as a compliance chamber, to containment housing 55. As further illustrated by FIG. 1, containment housing 55 may include first and second ends 57, 58 to which brackets 59 may be separately mounted. Brackets 59 may be used for hoisting marine vibrator 5, for example when deploying marine vibrator 5 in the water. By way of example, brackets 59 may facilitate attachment of marine vibrator 5 to tow lines, a survey vessel (e.g., survey vessel 225 on FIG. 13), or other suitable device or mechanism used in conjunction with towing marine vibrator 5 through a body of water.

Piston plates 10 may typically be constructed of a material that will not deform, bend or flex when in use. By way of example, piston plates 10 may comprise, without limitation, steel (e.g., stainless steel), aluminum, a copper alloy, glass-fiber reinforced plastic (e.g., glass-fiber reinforced epoxy), carbon fiber reinforced plastic, and combinations thereof. In some embodiments, piston plates 10 may be substantially flat and rectangular in shape. By way of example, piston plate 10 shown on FIG. 1 is rectangular in shape except with rounded corners. In some embodiments, piston plates 10 may in the form of flat, circular disks. By way of example, piston plates 10 may each be a flat, circular disk having substantially uniform thickness. However, other configurations, including both axially-symmetric and not, of piston plates 10 may be suitable for particular applications. By way of example, piston plates 10 may be square, elliptical, or other suitable shape for providing the desired acoustic energy. In alternative embodiments, piston plates 10 may be curved, either convexly protruding into interior volume 95, or concavely expanding interior volume 95. In general, piston plates 10 have a thickness that provides stiffness and also withstands expected pressures. As will be appreciated by those of ordinary skill in the art with the benefit of this disclosure, the plate thickness may vary based on the material of construction, among other factors. As will be discussed in more detail below, the mass load of piston plates 10 and the spring constant of mechanical spring elements 65 may be selected (i.e. tuned) in a manner to produce a first resonance frequency within the desired seismic frequency range when marine vibrator 5 is submerged in water at a depth of from about 0 meters to about 300 meters. While a single piston plate 10 is illustrated on either side of fixture 125, embodiments may include more than one piston plate 10 on either side of fixture 125. Moreover, embodiments may include piston plates 10 that are smaller in size with respect to containment housing 55 as compared to those illustrated on FIGS. 1 and 4-6.

With continued reference to FIGS. 1 and 4-6, piston plates 10 may each be secured to containment housing 55 in a manner that allows movement of piston plates 10 relative to containment housing 55 with substantially no bending or flexing of piston plates 10. In the embodiment of FIG. 1, a pair of piston plates 10 is shown. One of the piston plates 10 may be disposed on one side of containment housing 55 while the other piston plates 10 may be disposed on the opposing side of containment housing 55. As illustrated, one of the piston plates 10 may be coupled to the containment housing 55 at or near the first surface 75 and the other piston plate 10 may be coupled to the containment housing 55 at or near the second surface 80. Piston plates 10 may each cover a corresponding one of the first opening 85 or second opening 90 in the respective first surface 75 and second surface 80 of containment housing 55. In the illustrated embodiment, piston plates 10 are coupled to containment housing 55 by way of rubber seals 60. Rubber seals 60 may not hold piston plates 10 in place but rather may flex (or otherwise move) to permit movement of piston plates 10 at their outer edges. In particular embodiments, piston plates 10 may function as piston transducers, wherein each of the piston plates 10 moves back forth by actuation of the drivers 70. Movement of pistons plates 10 is illustrated in FIGS. 5 and 6 by arrows 100. In contrast to flextensional-shell type marine vibrators, piston plates 10 may not bend or flex in operation, but rather may move back and forth acting against the surrounding water.

Turning again to FIGS. 1 and 4-6, drivers 70, may be one of a variety of types of drivers 70, for example electrodynamic drivers. In some embodiments, the drivers 70 may be "moving coil" or "voice coil" drivers, which may provide the ability to generate very large acoustic energy amplitudes. Although the particular embodiment described herein shows four uni-directional drivers utilized in parallel, embodiments in which one or more bi-directional drivers, embodiments with one or more uni-directional drivers, or embodiments in which more or less than four uni-directional drivers are utilized, are each within the scope of the invention. As best seen in FIGS. 5 and 6, a pair of drivers 70 may be coupled to an interior surface 105 of one piston plate 10, while another pair of drivers 70 may be coupled to an interior surface 105 of the other piston plate 10. Drivers 70 may also be coupled to fixture 125.

As illustrated, drivers 70 may each comprise a unidirectional, moving coil driver, comprising an electric coil 110, transmission element 115, and magnetic circuitry 120, which work together to generate a magnetic field. As illustrated, magnetic circuitry 120 may be connected to fixture 125, while transmission element 115 may connect to the corresponding piston plate 10. In some embodiments (not illustrated), this arrangement may be reversed (i.e., magnetic circuitry 120 connects to the corresponding piston plate 10, while transmission element 115 connects to fixture 125). As illustrated, each transmission element 115 may transfer the motion of the corresponding electric coil 110 to interior surface 105 of the corresponding piston plate 10. When electrical current I is applied to electric coil 110, a force F acting on electric coil 110 may be generated as follows:

$$F = IlB \quad \text{(Eq. 1)}$$

Where I is the current, l is the length of the conductor in electric coil 110, and B is the magnetic flux generated by magnetic circuitry 120. By varying the magnitude of the electrical current and consequently the magnitude of the force acting on electric coil 110, the length of the driver stroke may vary. Each driver 70 may provide stroke lengths of several inches up to and including about 10" which may allow the marine vibrator 5 to generate enhanced amplitude acoustic energy output in the low frequency ranges, for example, between about 1 Hz and about 10 Hz when marine vibrator 5 is submerged in water at a depth of from about 0 meters to about 300 meters. Magnetic circuitry 120 may comprise permanent magnets, though any device capable of generating a magnetic flux may be incorporated.

In the illustrated embodiment, mechanical spring elements 65 (e.g., in the form of coil springs) are disposed in containment housing 55 on either side of fixture 125. As best seen in FIG. 6, pairs of mechanical spring elements 65 may be located in either side of fixture 125, with a first pair of mechanical spring elements 65 disposed on one side of fixture 125, and a second pair of mechanical spring elements 65 may be disposed on the opposing side of fixture 125. Mechanical spring elements 65 in the first pair may be disposed on opposite sides of the drivers 70 from one another, and mechanical spring elements 65 in the second pair may also be disposed on opposite sides of the drivers 70 from one another. Mechanical spring elements 65 may each extend between a corresponding one of piston plates 10 and fixture 125. Mechanical spring elements 65 may be coupled to fixture 125 and at least one of piston plates 10 to exert a biasing action against piston plates 10. A wide variety of different mechanical spring elements 65 may be used that are suitable for exerting the desired biasing action against piston plates 10, including both linear and non-linear springs. In particular embodiments, mechanical spring elements 65 may be any of a variety of different types of springs, including compression springs, torsion springs, or other suitable springs for exerting the desired biasing action. Specific examples of mechanical spring elements 65 that may be used include coil springs, flat springs, bow springs, and leaf springs, among others. Suitable mechanical spring elements 65 may be constructed from spring steel or other suitable resilient material, such as glass-fiber reinforced plastic (e.g., glass-fiber reinforced epoxy), carbon fiber reinforced plastic, and combinations thereof. In some embodiments, the dimensions, material make-up, and the shape of mechanical spring elements 65 may be selected to provide a sufficient spring constant for vibrations in the seismic frequency range of interest when the marine vibrator 5 is submerged in water at a depth of from about 0 meters to about 300 meters.

In the illustrated embodiment, marine vibrator 5 may further include variable mass load 20 implemented by container 15 attached to piston plates 10. Container 15 may be attached to an exterior surface 130 of piston plates 10. While not shown, container 15 may include holes or other openings formed therein. These holes may be fitted with valves that may be operated remotely to adjust the amount of water, and thus vary the mass load, that will be allowed in to the different compartments of container 15. By using this method, the resonance frequency may be adjusted depending on the depth. Accordingly, when marine vibrator 5 is lowered into water, water may enter container 15, and thus increase the variable mass load 20 of container 15. In this manner, variable mass load 20 may be variable based on the amount of water in container 15. Therefore, the resonance frequency for marine vibrator 5 may be selected based at least in part on variable mass load 20.

In some embodiments, a fixture 125 suspends drivers 70 within containment housing 55. For example, in the illustrated embodiment, fixture 125 extends along the major axis of containment housing 55 and may be coupled to either end of containment housing 55. Fixture 125 may be circular, square, rectangular, or other suitable cross-section as desired for a particular application. An example of a suitable fixture 125 may include a rod, beam, plate, or other suitable frame for supporting internal components such as drivers 70 in containment housing 55. In particular embodiments, fixture 125 should be fixed to containment housing 55 in a mariner that restricts movement and therefore prevents undesired contraction of the major axis of containment housing 55. In particular embodiments, piston plates 10 may work in symmetry above and below fixture 125. In other words, in some embodiments, fixture 125 may divide marine vibrator 5 into symmetrical halves with respect to at least the piston plates 10, mechanical spring elements 65, and drivers 70.

In the illustrated embodiment, coupling of rubber seals 60 to piston plates 10 is shown. Rubber seals 60 may also be coupled to containment housing 55, for example, to form a water-tight seal between piston plates 10 and containment housing 55. In general, rubber seals 60 may be configured to allow movement of piston plates 10 while also maintaining the appropriate seal. Rubber seals 60 may have significant curvature to permit significant amplitude of movement. By way of example, this permitted movement may further enable piston plates 10 to have several inches of travel, e.g., piston plates 10 may move back and forth relative to containment housing 55 a distance of from about 1 inch to about 10 inches (or more). Other techniques for permitting movement may be used, including the use of seals with bellows or accordion-type configurations.

As would be understood by one of ordinary skill in the art, the total impedance that may be experienced by a marine vibrator 5 may be expressed as follows:

$$Z_r = R_r + jX_r \tag{Eq. 2}$$

where $Z_r$ is total impedance, $R_r$ is radiation impedance, and $X_r$ is reactive impedance.

In an analysis of the energy transfer of the marine vibrator 5, the system may be approximated as a baffled piston. In the expression of the total impedance that will be experienced, the radiation impedance $R_r$ of a baffled piston may be:

$$R_r = \pi a^2 \rho_o c R_1(x) \tag{Eq. 3}$$

and the reactive impedance may be:

$$X_r = \pi a^2 \rho_o c X_1(x) \tag{Eq. 4}$$

where $$x = 2ka = (4\pi a/\lambda) = (2\omega a/c) \tag{Eq. 5}$$

and where $$R_1(x) = 1 - (2/x)J_{1(x)} \text{ and} \tag{Eq. 6}$$

$$X_1(x) = \left(\frac{4}{\pi}\right) \int_0^{\pi/2} \sin(x\cos\alpha)\sin^2\alpha \, d\alpha \tag{Eq. 7}$$

where $\rho_o$ is the density of water, $\omega$=radial frequency, k=wave number, a=radius of piston, c=sound velocity, $\lambda$=wave length, and $J_1$=Bessel function of the first order.

Using the Taylor series expansion on the above equations yields the following:

$$R_1(x) = \frac{x^2}{2^2 1! 2!} - \frac{x^4}{2^4 2! 3!} + \cdots \tag{Eq. 8}$$

$$X_1(x) = \frac{4}{\pi}\left(\frac{x}{3} - \frac{x^3}{3^2 5} + \frac{x^5}{3^2 5^2 7} - \cdots\right) \tag{Eq. 9}$$

For low frequencies, when x=2ka is much smaller than 1, the real and imaginary part of the total impedance expression may be approximated with the first term of the Taylor expression. The expressions for low frequencies, when the wave length is much larger than the radius of the piston becomes:

$$R_1(x) = (\tfrac{1}{2})(ka)^2 \tag{Eq. 10}$$

$$X_1(x) \to (8ka)/(3\pi) \tag{Eq. 11}$$

It follows that, for low frequencies, R will be a small number compared to X, which suggests a very low efficiency signal generation. However, embodiments may introduce a resonance in the lower end of the frequency spectrum so that low frequency acoustic energy may be generated more efficiently. At resonance, the imaginary (reactive) part of the impedance is cancelled, and the marine vibrator may be able to efficiently transmit acoustic energy into the body of water.

Figure 7:
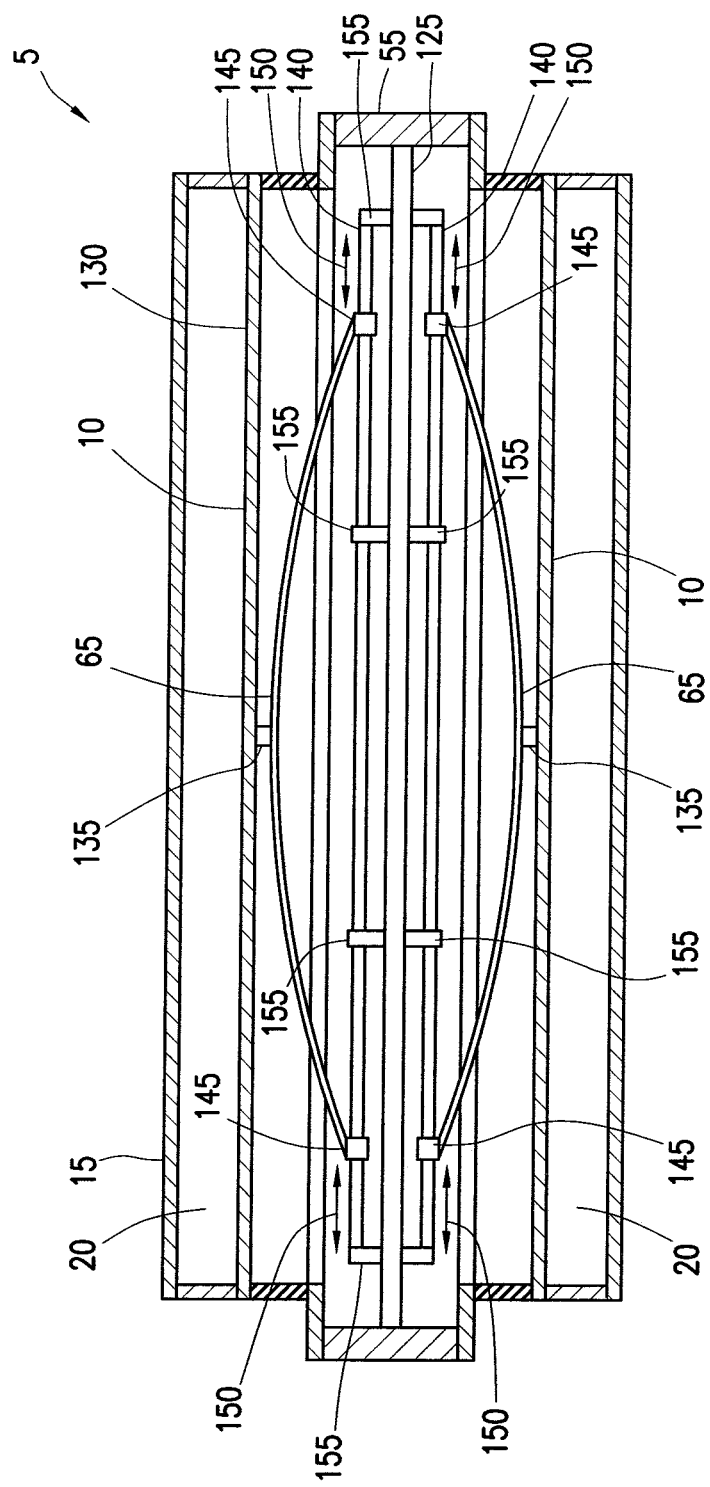
FIG. 7 illustrates a cross-sectional view of an embodiment of a marine vibrator with an alternative embodiment of a mechanical spring element taken along line 3-3 of FIG. 4.

FIG. 7 illustrates a cross-sectional view of one embodiment of marine vibrator 5 that comprises an alternative embodiment of mechanical spring element 65. This cross-sectional view is taken along line 3-3 of FIG. 4. In contrast to the mechanical spring elements of FIGS. 4-6 which are illustrated as coiled springs, FIG. 7 illustrates mechanical spring elements 65 in the form of a bow spring. In this cross-sectional view of FIG. 7, certain elements of marine vibrator 5, such as the drivers 70, are not visible.

The following description is for one of mechanical spring elements 65; however, because fixture 125 provides a line of symmetry, this description is equally applicable to both of mechanical spring elements 65. As illustrated in FIG. 7, one of mechanical spring elements 65 may be coupled to one of piston plates 10 and fixture 125. Mechanical spring element 65 may be coupled to piston plate 10 at attachment point 135, which may be a fixed connection, for example, that does not permit movement. Mechanical spring element 65 may be coupled to supplemental fixture 140, which may be in the form of a beam, rod, or other suitable frame for supporting mechanical spring element 65 in containment housing 55. Mechanical spring element 65 may be coupled to supplemental fixture 140 by way of bearings 145. In particular embodiments, bearings 145 may be linear bearings that permit linear movement of the ends of mechanical spring element 65 as represented by arrows 150. In this manner, mechanical spring element 65 may be allowed to flex and provide a biasing force to piston plate 10 upon its movement. Supplemental fixture 140 may be coupled to fixture 125 at one or more of fixture attachment points 155, which may be fixed connections that do not permit movement. Additionally, marine vibrator 5 of FIG. 7 is illustrated with a variable mass load 20 implemented via container 15 attached to exterior surface 130 of piston plate 10 in a substantially similar manner as was illustrated in FIGS. 1, 5, and 6. As in FIGS. 1, 5, and 6, variable mass load 20 may be variable based on the amount of water in container 15. Therefore, the resonance frequency for marine vibrator 5 is selected based at least in part on the variable mass load 20.

Figure 8:
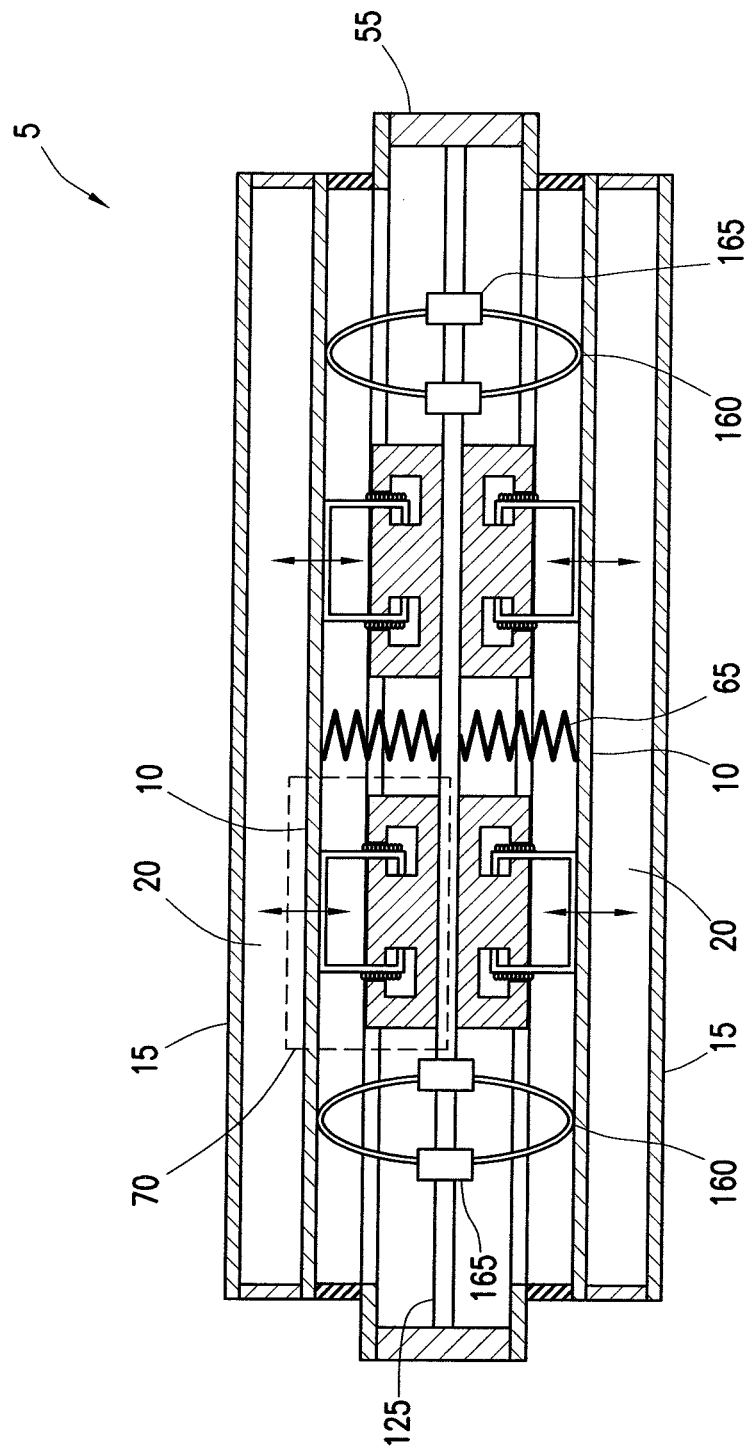
FIG. 8 illustrates another example embodiment of the marine vibrator of FIGS. 1 and 4 with a variable mass load in cross-section.

Turning now to FIG. 8, marine vibrator 5 is illustrated as further comprising two mass spring elements 160 with weights 165 affixed thereto. Mass springs elements 160 shown on FIG. 8 may also be used in conjunction with the mechanical spring elements 65 shown on FIG. 7 (or other suitable type of mechanical spring element 65). As illustrated, mass spring elements 160 may be generally elliptically shaped. As illustrated, mass spring elements 160 may be coupled to fixture 125 and piston plates 10. In the illustrated embodiment, a pair of mass spring elements 160 are shown on either side of fixture 125 so that marine vibrator 5 comprises four mass spring elements 160. However, it should be understood that more or less than four mass spring elements 160 may be utilized for a particular application. As will be described below, in various embodiments, the spring constant of mass spring elements 160 and the mass of weights 165 may be selected in a manner to achieve a second system resonance frequency within the seismic frequency range of interest when marine vibrator 5 is submerged in water at a depth of from about 0 meters to about 300 meters. In a particular embodiment, marine vibrator 5 may exhibit a first resonance frequency of about 2.5 Hz and a second resonance frequency of about 4.5 Hz when submerged in water at a depth of from about 0 meters to about 300 meters. Although a marine vibrator 5 that does not include mass spring elements 160, as shown in the embodiment illustrated in FIGS. 4-6, may display a second resonance frequency, the second resonance frequency would typically be much higher and thus outside the seismic frequency range of interest. Additionally, marine vibrator 5 of FIG. 8 is illustrated with a variable mass load 20 implemented via container 15 attached to exterior surface 130 of piston plate 10 in a substantially similar manner as was illustrated in FIGS. 1, 5, and 6. As in FIGS. 1, 5, and 6, variable mass load 20 may be variable based on the amount of water in container 15. Therefore, the resonance frequency for marine vibrator 5 is selected based at least in part on the variable mass load 20.

In some embodiments, the marine vibrator 5 may display at least one resonance frequency (when submerged in water at a depth of from about 0 meters to about 300 meters) between about 1 Hz to about 200 Hz. In alternative embodiments, the marine vibrator 5 may display at least one resonance frequency (when submerged in water at a depth of from about 0 meters to about 300 meters) between about 0.1 Hz and about 100 Hz, alternatively, between about 0.1 Hz and about 10 Hz, and alternatively, between about 0.1 Hz and about 5 Hz. In some embodiment, the marine vibrator 5 may display at least two resonance frequencies of about 10 Hz or lower. The first resonance frequency may result substantially from interaction of the outer piston plate 10 and the mechanical spring element 65. The second resonance frequency may result substantially from the interaction of the mass spring elements 160 with the added weights 165.

Figure 9:
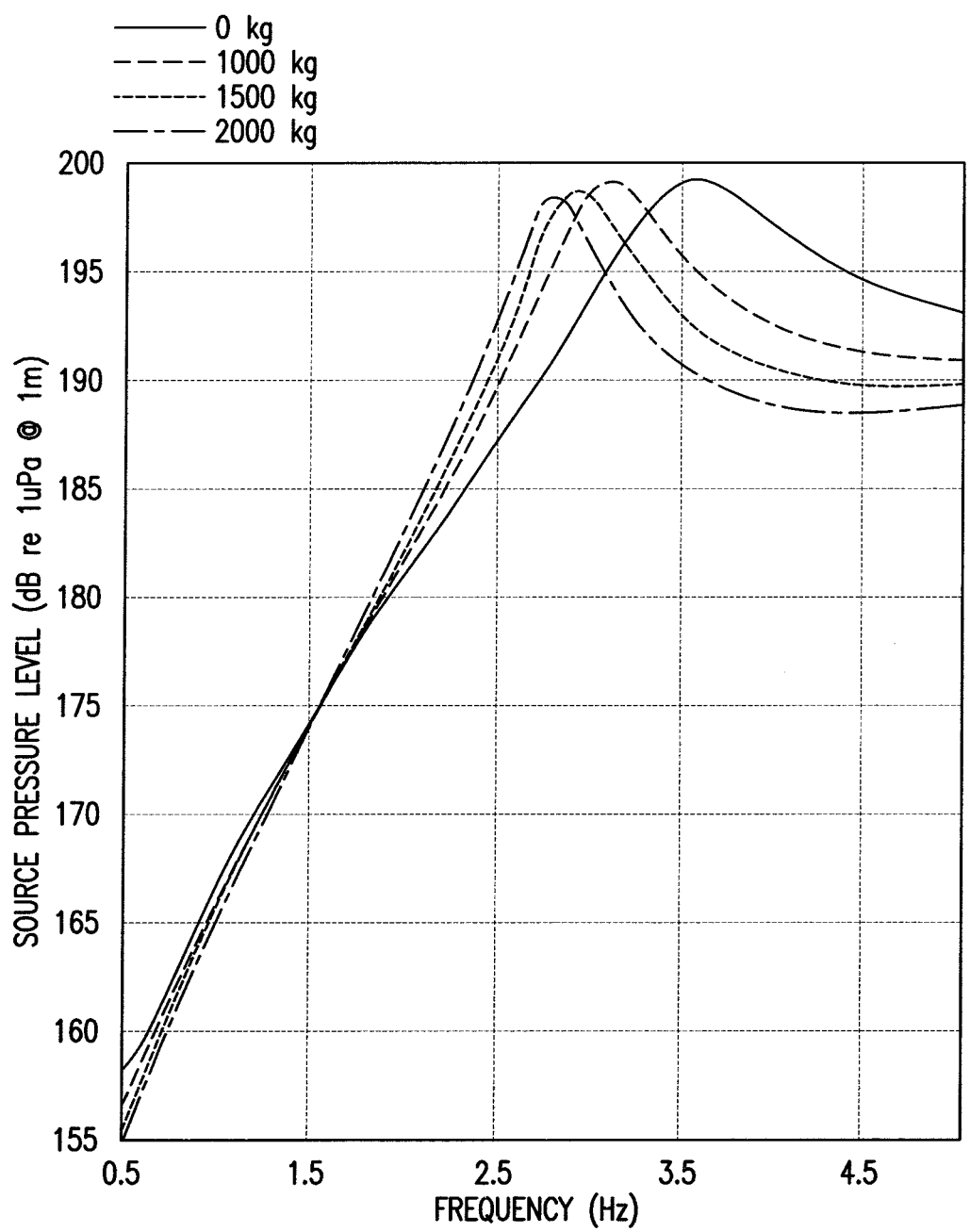
FIG. 9 illustrates a simulated amplitude spectrum showing the effect on resonance frequency of adding a mass load to a marine vibrator in accordance example embodiments.

FIG. 9 illustrates the results from a simulation of the first resonance frequency of marine vibrator 5 towed at 50 meters. FIG. 9 represents the output of marine vibrator 5 comprising a variable mass load 20 of 0 kilograms ("kg"), 1000 kg, 1500 kg, and 2,000 kg respectively. As illustrated, the addition of variable mass load 20 decreased the resonance frequency, more particularly; the resonance of marine vibrator 5 was shifted from 3.4 Hz to 2.7 Hz with the addition of 2000 kg. Below 2 Hz, there was very little difference in the sound output.

In evaluating the addition of a variable mass load 20, finite element analysis may be utilized as known to those of ordinary skill in the art. In such an analysis, the following principles may be relevant. If piston plate 10 of marine vibrator 5 is approximated as a baffled piston, then, for low frequencies, variable mass load 20, or the equivalent fluid mass acting on piston plate 10 may be:

$$M_{piston} = \rho_o (8a^3/3) \tag{Eq. 12}$$

where $M_{piston}$ is the mass load acting on piston plate 10, $\rho_o$ is the density of water surrounding marine vibrator 5, and a is the equivalent radius for a piston plate which corresponds to the size of piston plate 10.

Mechanical spring elements 65 may also have a spring constant in the direction of the moving electric coils (e.g., electric coil 110 on FIGS. 4-6). Therefore, with the addition of variable mass load 20, the first resonance $f_{resonance-1}$, due to the interaction of piston plate 10 and its mechanical spring element 65 may be substantially determined by the following mass spring relationship:

$$f_{resonance-1} = \frac{1}{2\pi} \sqrt{\frac{K_{piston\_spring}}{M_{piston} + M_{mass\ load}}} \tag{Eq. 13}$$

where $K_{piston\_spring}$ is the spring constant of mechanical spring element 65 attached to piston plate 10, $M_{piston}$ is the mass load of piston plate 10, and $M_{mass\ load}$ is variable mass load 20.

To achieve efficient energy transmission in the seismic frequency range of interest, it may be desirable to achieve a second resonance frequency within the seismic frequency range of interest. In the absence of mass spring elements 160 (as shown in FIG. 8) with added weights 165 (also as shown in FIG. 8), the second resonance frequency would occur when piston plate 10 has its second Eigen-mode. This resonance frequency, however, is normally much higher than the first resonance frequency and not desirable, and accordingly, would typically be outside the seismic frequency range of interest. As is evident from the foregoing equation, the resonance frequency will be reduced if variable mass load 20 is increased. However, in order to add sufficient mass to achieve a second resonance frequency within the seismic frequency range of interest, the amount of mass required in variable mass load 20 to achieve a desirable second resonance frequency may make such a system less practical for use in marine seismic surveying operations.

Therefore, in some embodiments, mass spring elements 160 may be included inside marine vibrator 5 with added weights 165 on the side of the mass spring elements 160. Mass spring elements 160 may have a transformation factor $T_{spring}$ between the long and short axis of its ellipse, so that the deflection of the two side portions will have a higher amplitude than the deflection of the end attached to piston plate 10 and driver 70.

The effect of such added weights 165 is equivalent to adding mass on the end of driver 70 where it is attached to piston plate 10.

$$M_{spring} = (T_{spring})^2 \cdot M_{added} \tag{Eq. 14}$$

Use of mass spring elements 160 with added weights 165, may allow the second resonance frequency of the system to be tuned so that the second resonance frequency is within the seismic frequency range of interest, thereby improving the efficiency of the marine vibrator 5 in the seismic frequency range of interest.

$$f_{resonance2} = \frac{1}{2\pi} \sqrt{\frac{K_{spring} + K_{piston\_spring}}{(T_{spring})^2 \cdot M_{added} + M_{shell} + M_{mass\ load}}} \tag{Eq. 15}$$

where $K_{spring}$ is the spring constant of mass spring elements 160, and $K_{piston\_spring}$ is the spring constant of the mechanical spring element 65 attached to piston plate 10.

Accordingly, it may be possible, as shown above, to select weights 165 on mass spring elements 160 to tune the second resonance frequency. It may also be possible to select the extent of influence the second resonance frequency may have on the system. By way of example, if mass spring elements 160 have low spring constants compared to mechanical spring element 65 attached to piston plate 10, and a matching weight 165 is added to mass spring elements 160, mass spring elements 160 with weights 165 will function relatively independently from mechanical spring element 65 attached piston plate 10. In such cases, the second resonance frequency may be as follows:

$$f_{resonance2} = \frac{1}{2\pi}\sqrt{\frac{K_{spring}}{(T_{spring})^2 \cdot M_{added}}} \qquad \text{(Eq. 16)}$$

In the same way, it may also be possible in some embodiments to make the second resonance frequency very large by selecting a high spring constant for mass spring elements 160 with a matching weight 165 such that the second resonance frequency will have a larger amplitude than the first resonance frequency.

Figure 10:
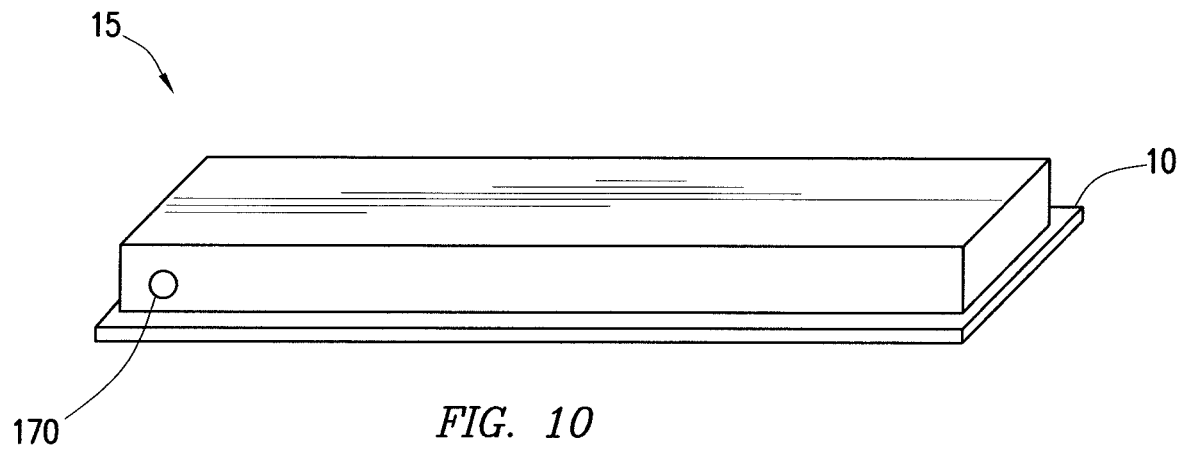
FIG. 10 illustrates an example embodiment of a container for adding a variable mass load to a marine vibrator in accordance with example embodiments.

FIG. 10 illustrates container 15 for adding variable mass load 20 to marine vibrator 5 (e.g., as illustrated on FIGS. 1 and 5-8) in accordance with some embodiments. An interior volume may be formed inside container 15, for example, to hold water. As illustrated, container 15 may have at least one water inlet 170 to allow ingress of water into the interior volume of container 15. When container 15 is submerged in water, water may enter the container 15 by way of the water inlet 170 to add variable mass load 20 to marine vibrator 5. The water may exit container 15 as it is lifted out of the water. In this manner, container 15 may add little mass to marine vibrator 5 at the surface but may add mass to marine vibrator 5 at depth based on the amount of water in container 15. It should be understood that while only a single water inlet 170 is shown on FIG. 10, the particular configuration and number of water inlets 170 in container 15 may be varied as desired for a particular application. The number and configuration of water inlets 170 may be selected, for example, based on the desired rate and amount of water ingress into (or egress from) container 15. In some embodiments, container 15 may be sized to hold from about 0.1 m³ to about 4 m³ of water in volume and about 1 m³ of water in some embodiments.

Figure 11:
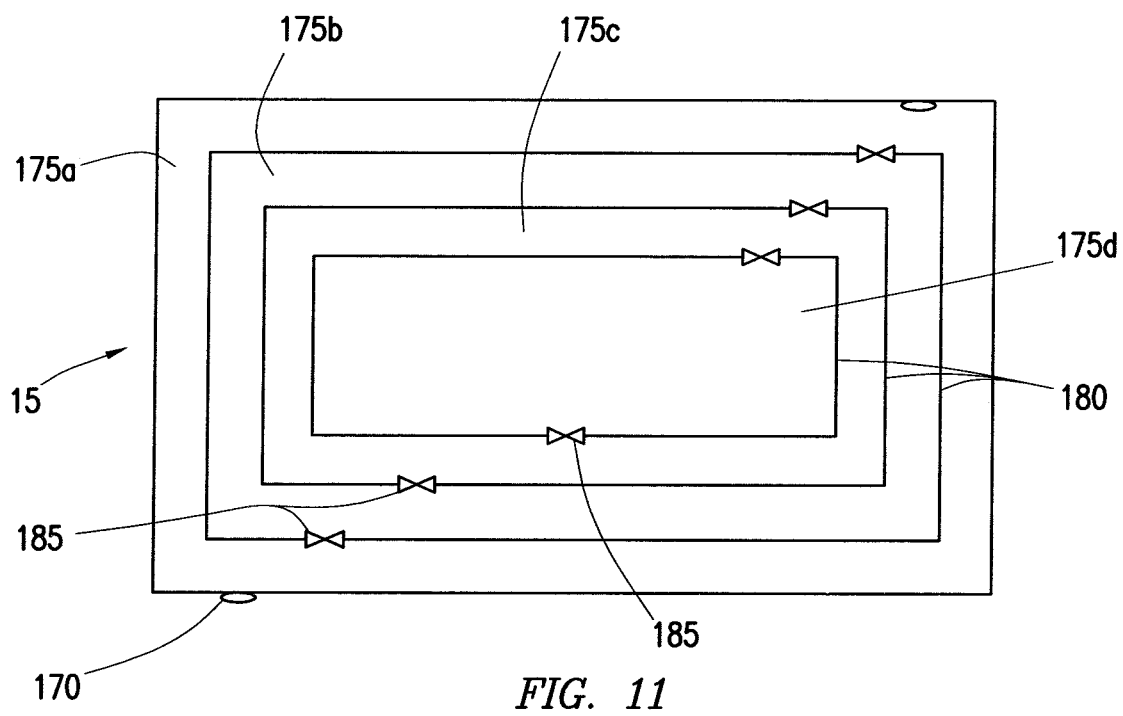
FIG. 11 illustrates an example embodiment of a container having multiple compartments for adding a variable mass load to a marine vibrator in accordance with example embodiments.

FIG. 11 illustrates a cross-sectional view of container 15 in accordance with certain embodiments. As illustrated, the interior volume of container 15 may be divided into a plurality of compartments 175a to 175d. Compartments 175a to 175d may be separated by internal walls 180. Valves 185 may be located in internal walls 180 which may be opened or closed to allow compartments 175a to 175d to selectively fill at different depths under water. In some embodiments, valves 185 may be remotely operated. Accordingly, container 15 may be optimized to provide a variable mass load 20 to marine vibrator 5 based on depth, thus allowing optimization of the resonance frequency at greater depths. For example, if marine vibrator 5 is towed at 40 meters, only a portion of container 15 may be filled with water, whereas if marine vibrator 5 is towed at 120 meters, the entirety of container 15 may be filled with water.

Figure 12:
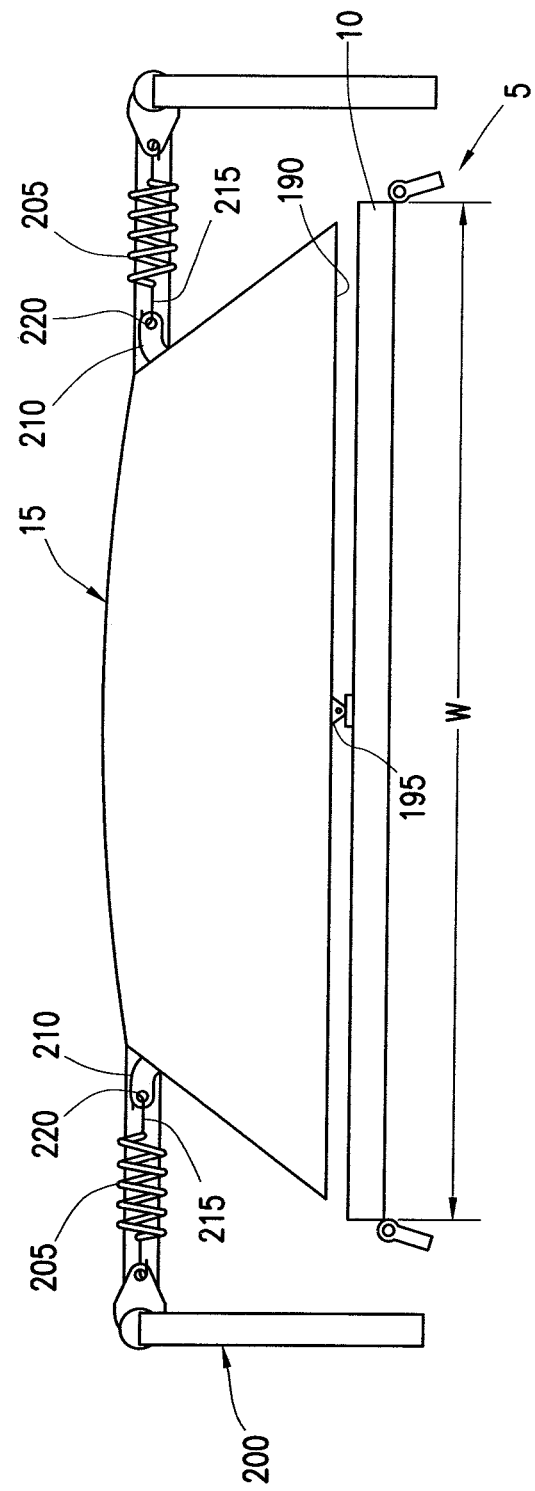
FIG. 12 illustrates an example attachment of a container to a marine vibrator in accordance with example embodiments.

FIG. 12 illustrates attachment of container 15 to marine vibrator 5 in accordance with certain embodiments. For simplicity, marine vibrator 5 is shown without an inner structure, such as a driver (e.g., driver 70 shown on FIG. 4) and other internal components. As illustrated, container 15 may be attached to outer piston plate 10 of marine vibrator 5. It may be desirable for container 15 to be attached as close as possible to marine vibrator 5 without contact (other than at attachment points), which may undesirably impact performance of marine vibrator 5. In some embodiments, lower surface 190 of container 15 may be a distance of about 1 centimeter or less from piston plate 10. It is to be understood that embodiments may include attachment of multiple containers 15 to any of the piston plates 10. As illustrated, container 15 may be attached to the marine vibrator 5 using one or more pin joints 195. In the illustrated embodiment, container 15 is attached at one or more points along the midline of piston plate 10. By placement of container 15 at the midline of piston plate 10, the resonance frequency of marine vibrator 5 may be shifted in accordance with example embodiments. Container 15 is considered to be attached at substantially the midline if the attachment is a distance from the middle of no more than 20% of the width of piston plate 10 between an edge of piston plate 10.

In the illustrated embodiment, container 15 is further coupled to frame 200. Coupling of container 15 to frame 200 may prevent tilting of container 15, for example, as marine vibrator 5 may be towed through water. As illustrated, frame 200 may surround marine vibrator 5. Container 15 may be coupled to frame 200 via one or more connecting springs 205. In some embodiments, connecting springs 205 may attach to tab elements 210 of container 15. For example, connecting springs 205 may include hooked portions 215 that are secured in holes 220 of tab elements 210.

Figure 13:
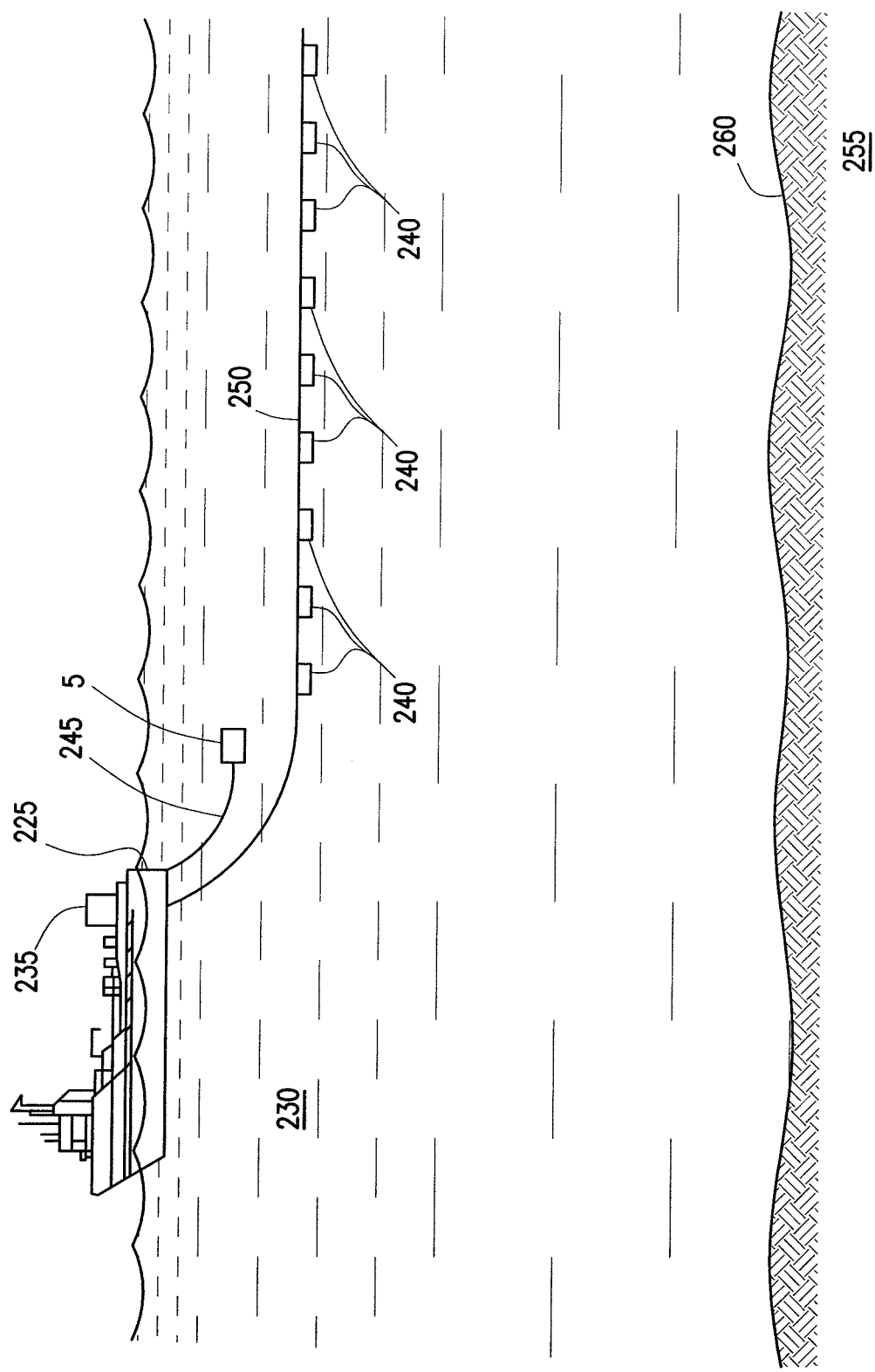
FIG. 13 illustrates an example embodiment of a marine seismic survey system using a marine vibrator.

FIG. 13 illustrates an example technique for acquiring marine seismic data that may be used with embodiments of the present techniques. In the illustrated embodiment, a survey vessel 225 moves along the surface of a body of water 230, such as a lake or ocean. The survey vessel 225 may include thereon equipment, shown generally at 235 and collectively referred to herein as a "recording system." The recording system 235 may include devices (none shown separately) for detecting and making a time indexed record of signals generated by each of seismic sensors 240 (explained further below) and for actuating a marine vibrator 5 at selected times. The recording system 235 may also include devices (none shown separately) for determining the geodetic position of the survey vessel 225 and the various seismic sensors 240.

As illustrated, survey vessel 225 (or a different vessel) may tow marine vibrator 5 in body of water 230. Source cable 245 may couple marine vibrator 5 to survey vessel 225. Marine vibrator 5 may be towed in body of water 230 at a depth ranging from 0 meters to about 300 meters, for example. While only a single marine vibrator 5 is shown in FIG. 13, it is contemplated that embodiments may include more than one marine vibrator 5 (or other type of sound source) towed by survey vessel 225 or a different vessel. In some embodiments, one or more arrays of marine vibrators 5 may be used. At selected times, marine vibrator 5 may be triggered, for example, by recording system 235, to generate acoustic energy. Survey vessel 225 (or a different vessel) may further tow at least one sensor streamer 250 to detect the acoustic energy that originated from marine vibrator 5 after it has interacted, for example, with rock formations 255 below water bottom 260. As illustrated, both marine vibrator 5 and sensor streamer 250 may be towed above water bottom 260. Sensor streamer 250 may contain seismic sensors 240 thereon at spaced apart locations. In some embodiments, more than one sensor streamer 250 may be towed by survey vessel 225, which may be spaced apart laterally, vertically, or both laterally and vertically. While not shown, some marine seismic surveys locate the seismic sensors 240 on ocean bottom cables or nodes in addition to, or instead of, a sensor streamer 250. Seismic sensors 240 may be any type of seismic sensors known in the art, including hydrophones, geophones, particle velocity sensors, particle displacement sensors, particle acceleration sensors, or pressure gradient sensors, for example. By way of example, seismic sensors 240 may generate response signals, such as electrical or optical signals, in response to detected acoustic energy. Signals generated by seismic sensors 240 may be communicated to recording system 235. The detected energy may be used to infer certain properties of the subsurface rock, such as structure, mineral composition and fluid content, thereby providing information useful in the recovery of hydrocarbons.

In accordance with an embodiment of the invention, a geophysical data product may be produced. The geophysical data product may include geophysical data that is obtained by a process that includes detecting the acoustic energy originating from marine vibrator 5. The geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the data product.

The foregoing figures and discussion are not intended to include all features of the present techniques to accommodate a buyer or seller, or to describe the system, nor is such figures and discussion limiting but exemplary and in the spirit of the present techniques.

What is claimed is:
1. A marine vibrator comprising:
   a containment housing;
   a piston plate;
   an interior volume, wherein the interior volume is at least partially defined by the containment housing and the piston plate;
   a fixture coupled to the containment housing;
   a mechanical spring element coupled to the piston plate and the fixture, wherein the mechanical spring element is at least partially disposed within the interior volume;
   a driver disposed in the marine vibrator, wherein the driver is coupled to the piston plate and the fixture, wherein the driver is at least partially disposed within the interior volume; and
   a container coupled to an exterior surface of the piston plate, wherein the container is configured to hold a variable mass load of water that is applied to the piston plate.
2. The marine vibrator of claim 1, wherein the marine vibrator has at least one resonance frequency of about 10 Hz or lower when submerged in water at a depth of from about 0 meters to about 300 meters.
3. The marine vibrator of claim 1, wherein the driver comprises an electro-dynamic driver.
4. The marine vibrator of claim 1, wherein the variable mass load increases with increasing depth of the container.
5. The marine vibrator of claim 1, wherein the container comprises one or more holes for ingress of water when the marine vibrator is placed under water.
6. The marine vibrator of claim 5, wherein at least some of the one or more holes comprise remotely operated valves.
7. The marine vibrator of claim 1, wherein the container comprises a plurality of compartments operable to selectively fill at different depths under water.

8. The marine vibrator of claim 1, wherein the mechanical spring element comprises at least one type of spring selected from the group consisting of: a bow spring, a coil spring, a flat spring, and a leaf spring.
9. The marine vibrator of claim 1, further comprising a second mechanical spring element disposed on an opposite side of the driver from the mechanical spring element.
10. The marine vibrator of claim 1, wherein the piston plate is coupled to the containment housing by way of a rubber seal, the piston plate covering an opening in a first side of the containment housing.
11. The marine vibrator of claim 1, wherein the marine vibrator further comprises a mass spring having weights affixed thereto, the mass spring being coupled to the fixture and the piston plate.
12. The marine vibrator of claim 1, further comprising a frame surrounding the container and the piston plate, wherein the container is coupled to the frame via one or more connecting springs.
13. A system comprising:
    a frame;
    a marine vibrator comprising:
      a containment housing;
      a fixture coupled to the containment housing;
      a first piston plate;
      a first driver coupled to the fixture and the first piston plate, wherein the first driver is configured to move the first piston plate back and forth;
      a first pair of mechanical spring elements coupled to the first piston plate and the fixture, wherein the first pair of mechanical spring elements are positioned on opposite sides of the first driver from one another;
      a first container coupled to an exterior surface of the first piston plate, wherein the first container is configured to hold a variable mass load of water that is applied to the first piston plate, wherein the first container is coupled to the frame by one or more connecting springs, wherein the connecting springs are attached to tab elements of the first container;
      a second piston plate;
      a second driver coupled to the fixture and the second piston plate, wherein the second driver is configured to move the second piston plate back and forth;
      a second pair of mechanical spring elements coupled to the second piston plate and the fixture, wherein the second pair of mechanical spring elements are positioned on opposite sides of the second driver from one another; and
      a second container coupled to an exterior surface of the second piston plate, wherein the second container is configured to hold a variable mass load of water that is applied to the second piston plate.
14. The system of claim 13, wherein at least one of the first container or the second container comprises one or more holes for ingress of water when the marine vibrator is placed under water.
15. The system of claim 13, wherein at least one of the first container or the second container comprises one or more holes with remotely operated valves.
16. The system of claim 13, wherein at least one of the first container or the second container comprises a plurality of compartments operable to selectively fill at different depths under water.
17. The system of claim 13, wherein at least one of the first pair of mechanical spring elements or the second pair of mechanical spring elements is a bow spring.

18. The system of claim 13, wherein at least one of the first piston plate or the second piston plate is coupled to the containment housing by way of a rubber seal.

19. A method comprising:
towing a marine vibrator in a body of water in conjunction with a marine seismic survey;
triggering the marine vibrator to cause one or more piston plates in the marine vibrator to move back and forth wherein one or more mechanical spring elements exert a biasing force against the one or more piston plates, the one or more mechanical spring elements being coupled to the one or more piston plates and a fixture in the marine vibrator; and
optimizing a resonance frequency, wherein the optimizing a resonance frequency comprises varying a mass load on the one or more piston plates, wherein the varying the mass load comprises selectively filling compartments of the marine vibrator with water at different depths.

20. The method of claim 19, further comprising:
obtaining geophysical data;
processing the geophysical data to generate a geophysical data product, wherein the geophysical data product is obtained by a process that includes detecting acoustic energy originating from the marine vibrator;
recording the geophysical data product on a tangible, non-volatile computer-readable medium suitable for importing onshore; and
performing geophysical analysis onshore on the geophysical data product.

* * * * *